US008056066B2

(12) United States Patent
Chan et al.

(10) Patent No.: US 8,056,066 B2
(45) Date of Patent: Nov. 8, 2011

(54) METHOD AND APPARATUS FOR ADDRESS TAKEN REFINEMENT USING CONTROL FLOW INFORMATION

(75) Inventors: Edwin Chan, Richmond Hill (CA); Raul E. Silvera, Woodbridge (CA)

(73) Assignee: International Business Machines Corporation, Armonk, NY (US)

( * ) Notice: Subject to any disclaimer, the term of this patent is extended or adjusted under 35 U.S.C. 154(b) by 1112 days.

(21) Appl. No.: 11/843,369

(22) Filed: Aug. 22, 2007

(65) Prior Publication Data

US 2009/0055798 A1  Feb. 26, 2009

(51) Int. Cl.
*G06F 9/45* (2006.01)
(52) U.S. Cl. ................ 717/156; 717/155; 717/159
(58) Field of Classification Search .................. None
See application file for complete search history.

(56) References Cited

U.S. PATENT DOCUMENTS

| | | | | |
|---|---|---|---|---|
| 5,555,412 | A * | 9/1996 | Besaw et al. | 717/144 |
| 5,732,192 | A * | 3/1998 | Malin et al. | 703/2 |
| 5,768,596 | A * | 6/1998 | Chow et al. | 717/154 |
| 5,790,866 | A * | 8/1998 | Robison | 717/160 |
| 5,896,537 | A * | 4/1999 | Landi et al. | 717/132 |
| 6,045,585 | A * | 4/2000 | Blainey | 717/156 |
| 6,173,444 | B1 * | 1/2001 | Archambault | 717/159 |
| 6,457,023 | B1 * | 9/2002 | Pinter et al. | 1/1 |
| 6,925,636 | B2 * | 8/2005 | Haugen et al. | 717/146 |
| 6,970,985 | B2 * | 11/2005 | Moritz | 711/154 |
| 7,797,691 | B2 * | 9/2010 | Cockx et al. | 717/155 |
| 2006/0059476 | A1 * | 3/2006 | McIntosh et al. | 717/155 |
| 2007/0124711 | A1 * | 5/2007 | Jain et al. | 716/5 |

OTHER PUBLICATIONS

Fred Chow, et al., "Effective Representation of Aliases and Indirect Memory Operations in SSA Form", 1996, Lecture Notes in Computer Science, SpringerLink, pp. 253-267.*
Barry K, Rosen, et al., "Global Value Numbers and Redundant Computations", 1988, ACM, pp. 12-27.*
Bowen Alpern, et al., "Detecting Equality of Variables in Programs", 1988, ACM, pp. 1-11.*
Michael Hind, et al., "Assessing the Effects of Flow-Sensitivity on Pointer Alias Analyses", 1998, Springer-Verlag Berlin Heidelberg, pp. 57-81.*
Paul R. Carini, Harini Srinivasan, Michael Hind, "Flow-Sensitive Type Analysis for C++", IBM Research Report, 1995. [retrieved on Jun. 13, 2011], Retrieved from Internet<URL: http://www.research.ibm.com/people/h/hind20267.ps>; pp. 1-18.*

(Continued)

*Primary Examiner* — Tuan Dam
*Assistant Examiner* — Xi D Chen
(74) *Attorney, Agent, or Firm* — Yee & Associates, P.C.; David A. Mims, Jr.

(57) ABSTRACT

A computer implemented method, apparatus, and computer program product for obtaining aliasing information for a target variable in a computer program. A control flow graph representing the computer program is partitioned into an taken address portion that includes all reachable nodes in which an address of the target variable is taken and an untaken address portion that includes all other reachable nodes. All references to the target variable are replaced with a temporary variable in the untaken address portion. The target variable is initialized with the value from the temporary variable at each intermediary node in a set of intermediary nodes in the taken address portion. An intermediary node is a node at which an address of a target variable is taken. The aliasing information for the target variable is generated using the modified computer program.

10 Claims, 6 Drawing Sheets

OTHER PUBLICATIONS

Jong-Deok Choi, Michael Burke, Paul Carini, "Efficient Flow-Sensitive Interprocedural Computation of nter-Induced Aliases and Side Effects", 1993, Procd. of the 20th ACM SIGPLAN-SIGACT symposium on Principles of programming languages; [retrieved on Jun. 13, 2011], Retrieved from Internet<URL: http://portal.acm.org/citation.cfm?id=158639>; pp. 232-245.*

Postiff et al., "The Store-Load Address Table and Speculative Register Promotion", Proceedings of the 33rd Annual IEEE/ACM International Symposium on Microarchitecture, MICRO-33 2000, Dec. 2000, Monterey California, pp. 235-244.

* cited by examiner

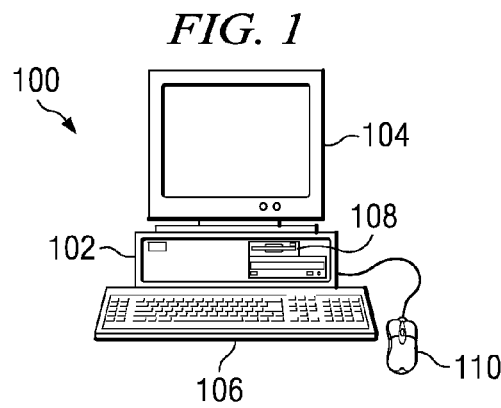
FIG. 1
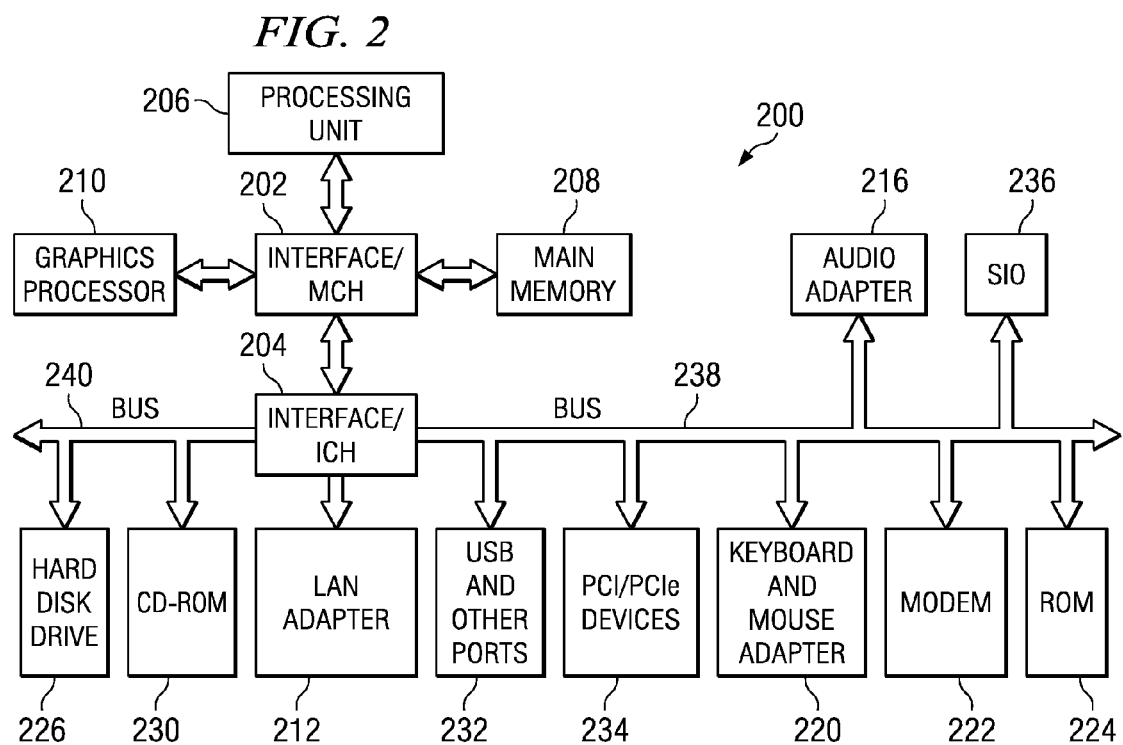
FIG. 3
```
int foot(int i) { .... }
int main() {
  int i;
  int N;
  int j;
  int *p = &foo;         304
  for (i=0; i<N; i++) {
    j += p(i);
  }
  bar(&i);               302
  return i+j;
}
```
300
FIG. 2

```
            11A
         void foo (int a)
         {
             if (condition true)
                 b += a;  ~1102
             else
                 bar(&a);  ~1104
         }
1100

11B
         void foo (int a)
         {
             T = a;  /1112
             if (condition true)
                 b += T;
             else
                 bar(&a);
         }
1110

11C
         void foo (int a)
         {
             T = a;
             if (condition true)
                 b += T;
             else
                 a = T;  /1122
                 bar(&a);
         }
1120
```

METHOD AND APPARATUS FOR ADDRESS TAKEN REFINEMENT USING CONTROL FLOW INFORMATION

BACKGROUND OF THE INVENTION

1. Field of the Invention

The present invention is related generally to a data processing system and in particular to a method and apparatus for compiling program code. More particularly, the present invention is directed to a computer implemented method, apparatus, and computer usable program code for flow control sensitive refinement of address taken variables.

2. Description of the Related Art

A compiler is a software component in a computer that translates a computer program written in one language into a different computer language. Typically, a compiler translates or compiles a high level language program into machine code for a target computer. An optimizing compiler is a software component for tuning or optimizing compiled code to improve some aspect of the compiled code so that the code will execute more rapidly or more efficiently so that the executable code will consume fewer processor resources.

In program code, when an address of a variable is taken, the content of the address may be overwritten during the execution of the code. Therefore, when program code is compiled and optimized, address taken variables should be taken into account when determining which code blocks to optimize and which code blocks should not be optimized or altered to improve execution performance. Current solutions for optimizing address taken variables include disambiguating the indirect references from the direct references to refine the alias set of address taken variable.

For example, in one solution, compilers analyze how address taken global variables and/or address taken local variables are being accessed in a program to refine the address taken variables. However, these current optimization techniques for refining address taken information do not take the control flow of a program into consideration.

The control flow of a program is the order in which statements in the program are executed. Typically, statements are executed in the order in which the statements are written in the program, in a top down fashion. However, control flow statements, such as loops and conditional statements, may alter the control flow, such that statements in the program code are no longer executed in order. Currently available techniques for optimizing code are either flow-insensitive or require interprocedural analysis, which is very costly in terms of compile time.

Therefore, compilers frequently treat address taken variables conservatively. These compilers generally store a value for a given address taken variable to memory for all the references to the given address taken variable that occur in the program code before the address of the given address taken variable is actually taken. Thus, if a variable is referenced in an "if" path and the variable's address is taken on the "else" path, current compilers will store its value to memory on both the "if" path and the "else" path, even though the address of the variable is only taken on the "else" path. This type of flow insensitive aliasing and the techniques that address them can be expensive to implement both in terms of compile time and compiler resources required to implement them.

SUMMARY OF THE INVENTION

The illustrative embodiments provide a computer implemented method, apparatus, and computer usable program code for obtaining aliasing information for a target variable in a computer program. In one embodiment, a set of intermediary nodes in a plurality of nodes in a control flow graph associated with the computer program is identified. An intermediary node is a node at which an address of a target variable is taken.

The control flow graph is partitioned into an taken address portion and an untaken address portion to form a modified computer program. The taken address portion comprises all reachable nodes within the plurality of nodes at which an address of the target variable is taken. The untaken address portion comprises all other reachable nodes within the plurality of nodes.

All references to a target variable are replaced with a temporary variable in the untaken address portion of the modified computer program. The target variable is initialized with the value from the temporary variable at each intermediary node in the set of intermediary nodes in the taken address portion of the modified computer program. The aliasing information for the target variable is generated using the modified computer program.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is a pictorial representation of a data processing system in which illustrative embodiments may be implemented;

FIG. 2 is a block diagram of a data processing system in which illustrative embodiments may be implemented;

FIG. 3 is a diagram of exemplary code having an address taken variable in accordance with an illustrative embodiment;

DETAILED DESCRIPTION OF THE PREFERRED EMBODIMENT

Figure 4:
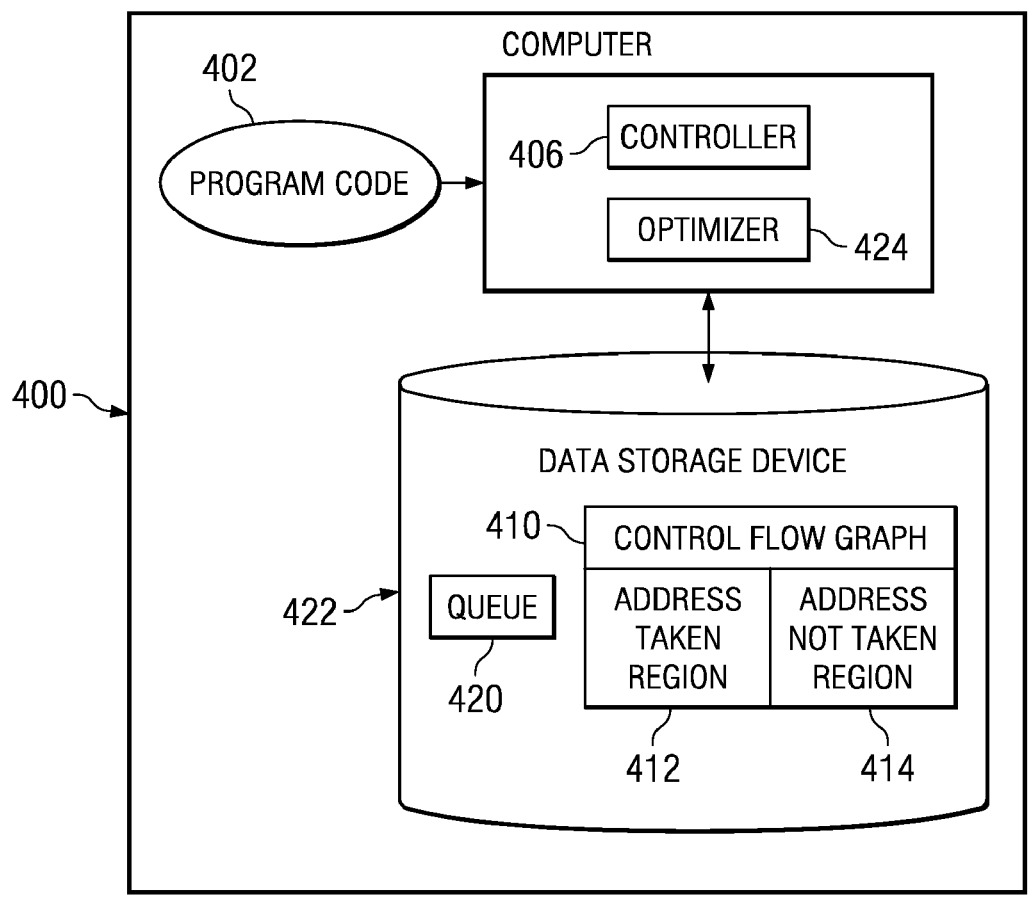
FIG. 4 is a block diagram illustrating a data flow through a compiler in accordance with an illustrative embodiment.

With reference now to the figures and in particular with reference to FIG. 1, a pictorial representation of a data processing system is shown in which illustrative embodiments may be implemented. Computer 100 includes system unit 102, video display terminal 104, keyboard 106, storage devices 108, which may include floppy drives and other types of permanent and removable storage media, and mouse 110. Additional input devices may be included with personal computer 100. Examples of additional input devices could include, for example, a joystick, a touchpad, a touch screen, a trackball, and a microphone.

Computer 100 also includes a compiler and/or a language processor. A language processor is a hardware device for performing tasks, such as processing high level language program code into machine code. Language processors are sometimes used in conjunction with programming languages, such as, without limitation, Fortran and Cobol. In this example, computer 100 includes an IBM® XL compiler. The compiler and/or language processor includes a controller for address taken refinement using control flow information in accordance with the illustrative embodiments.

Computer 100 may be any suitable computer, such as an IBM® eServer™ computer or IntelliStation® computer, which are products of International Business Machines Corporation, located in Armonk, N.Y. Although the depicted representation shows a personal computer, other embodiments may be implemented in other types of data processing systems. For example, other embodiments may be implemented in a network computer. Computer 100 also preferably includes a graphical user interface (GUI) that may be implemented by means of systems software residing in computer readable media in operation within computer 100.

Next, FIG. 2 depicts a block diagram of a data processing system in which illustrative embodiments may be implemented. Data processing system 200 is an example of a computer, such as computer 100 in FIG. 1, in which code or instructions implementing the processes of the illustrative embodiments may be located.

In the depicted example, data processing system 200 employs a hub architecture including an interface and memory controller hub (interface/MCH) 202 and an interface and input/output (I/O) controller hub (interface/ICH) 204. Processing unit 206, main memory 208, and graphics processor 210 are coupled to interface and memory controller hub 202. Processing unit 206 may contain one or more processors and even may be implemented using one or more heterogeneous processor systems. Graphics processor 210 may be coupled to interface and memory controller hub 202 through an accelerated graphics port (AGP), for example.

In the depicted example, local area network (LAN) adapter 212 is coupled to interface and I/O controller hub 204, audio adapter 216, keyboard and mouse adapter 220, modem 222, read only memory (ROM) 224, universal serial bus (USB) and other ports 232. PCI/PCIe devices 234 are coupled to interface and I/O controller hub 204 through bus 238. Hard disk drive (HDD) 226 and CD-ROM 230 are coupled to interface and I/O controller hub 204 through bus 240.

PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to interface and I/O controller hub 204.

An operating system runs on processing unit 206. This operating system coordinates and controls various components within data processing system 200 in FIG. 2. The operating system may be a commercially available operating system, such as Microsoft® Windows Vista™. (Microsoft® and Windows Vista are trademarks of Microsoft Corporation in the United States, other countries, or both). An object oriented programming system, such as the Java™ programming system, may run in conjunction with the operating system and provides calls to the operating system from Java™ programs or applications executing on data processing system 200. Java™ and all Java™-based trademarks are trademarks of Sun Microsystems, Inc. in the United States, other countries, or both.

Instructions for the operating system, the object-oriented programming system, and applications or programs are located on storage devices, such as hard disk drive 226. These instructions and may be loaded into main memory 208 for execution by processing unit 206. The processes of the illustrative embodiments may be performed by processing unit 206 using computer implemented instructions, which may be located in a memory. An example of a memory is main memory 208, read only memory 224, or in one or more peripheral devices.

The hardware shown in FIG. 1 and FIG. 2 may vary depending on the implementation of the illustrated embodiments. Other internal hardware or peripheral devices, such as flash memory, equivalent non-volatile memory, or optical disk drives and the like, may be used in addition to or in place of the hardware depicted in FIG. 1 and FIG. 2. Additionally, the processes of the illustrative embodiments may be applied to a multiprocessor data processing system.

The systems and components shown in FIG. 2 can be varied from the illustrative examples shown. In some illustrative examples, data processing system 200 may be a personal digital assistant (PDA). A personal digital assistant generally is configured with flash memory to provide a non-volatile memory for storing operating system files and/or user-generated data. Additionally, data processing system 200 can be a tablet computer, laptop computer, or telephone device.

Other components shown in FIG. 2 can be varied from the illustrative examples shown. For example, a bus system may be comprised of one or more buses, such as a system bus, an I/O bus, and a PCI bus. Of course the bus system may be implemented using any suitable type of communications fabric or architecture that provides for a transfer of data between different components or devices attached to the fabric or architecture. Additionally, a communications unit may include one or more devices used to transmit and receive data, such as a modem or a network adapter. Further, a memory may be, for example, main memory 208 or a cache such as found in interface and memory controller hub 202. Also, a processing unit may include one or more processors or CPUs.

The depicted examples in FIG. 1 and FIG. 2 are not meant to imply architectural limitations. In addition, the illustrative embodiments provide for a computer implemented method, apparatus, and computer usable program code for compiling source code and for executing code. The methods described with respect to the depicted embodiments may be performed in a data processing system, such as data processing system 100 shown in FIG. 1 or data processing system 200 shown in FIG. 2.

FIG. 3 is a block diagram of exemplary code having an address taken variable in accordance with an illustrative embodiment. Code 300 is a program code that includes a function bar( ) 302. In this example, the address of the variable "i" is only taken when the function bar( ) 302 is called. However, a currently available compiler that employs flow insensitive address taken analysis treats all the references of the variable "i" as potentially aliased to all unknown pointers.

The term alias refers to a pointer that references or points to the same location or object as another pointer.

In this example, the compiler must assume that the "p" can point to "i" in line 304, even though the control flow for program code 300 prevents the address of "i" from being assigned to the variable "p." Consequently, many optimization opportunities are inhibited or limited, such as, without limitation, the parallelization opportunity for the loop.

In this example, even pointer analysis may not be able to achieve the opportunity for parallelization of the loop because the function may be too complicated to analyze. Therefore, using the currently available methods and techniques, the code generated by the compiler is less efficient and/or less optimized than possible.

The illustrative embodiments recognize a need for a control flow-sensitive method to refine address taken variables. The illustrative embodiments provide a computer implemented method, apparatus, and computer usable program code for obtaining aliasing information for a target variable in a computer program. Aliasing information is information describing variables that alias another pointer. A variable or pointer aliases another pointer when both the pointers reference or point to the same location or object.

In one embodiment, a set of intermediary nodes in a plurality of nodes in a control flow graph associated with the computer program is identified. An intermediary node is a node at which an address of a target variable is taken. The control flow graph is partitioned into a taken address portion and an untaken address portion to form a modified computer program. Partitioning the control flow graph into the taken address portion and the untaken address portion does not change the application execution order of the control flow graph. The taken address portion comprises all reachable nodes within the plurality of nodes at which an address of the target variable is taken. The untaken address portion comprises all other reachable nodes within the plurality of nodes.

All references to a target variable are replaced with a temporary variable in the untaken address portion of the modified computer program. The temporary variable may also be referred to as a temporary variable. The target variable is initialized with the value from the temporary variable at each intermediary node in the set of intermediary nodes in the taken address portion of the modified computer program. The aliasing information for the target variable is obtained using the modified computer program.

In this manner, the embodiments may be implemented to provide a limited form of flow sensitive aliasing information that avoids the inefficiencies and costly overhead of flow insensitive aliasing techniques that are forced to rely on conservative optimizations.

It will be appreciated by one skilled in the art that the words "optimize", "optimization" and related terms are terms of art that refer to improvements in speed and/or efficiency of a computer program, and do not purport to indicate that a computer program has achieved, or is capable of achieving, an "optimal" or perfectly speedy/perfectly efficient state.

Turning now to FIG. 4, a block diagram illustrating a data flow through a compiler is depicted in accordance with an illustrative embodiment. Computer 400 may be implemented using any type of computing device, such as a personal computer, laptop, personal digital assistant, or any other computing device depicted in FIGS. 1 and 2.

Program code 402 is a computer program written in a programming language. Program code 402 is compiled or translated into a second programming language, such as machine language code. Machine language code is code that is ready for execution by computer 400. Compiler 404 is a software component for compiling or translating program code 402 from a first programming language into a second programming language. Compiler 404 may be implemented as any type of known or available compiler, optimizing compiler, and/or language processor.

Compiler 404 includes controller 406. Controller 406 is a software component for using control flow information for address taken refinement. In other words, controller 406 obtains aliasing information for a target variable in program code 402 and utilizes the aliasing information to improve optimization of program code 402.

Control flow graph 410 is a control flow for program code 402. A control flow graph is a representation of all paths that might be traversed through program code 402 during execution of program code 402. Each node in control flow graph 410 represents a basic block of code. A basic block is a straight-line piece of code that is executed without any jumps in the control flow of code execution.

Controller partitions control flow graph 410 for program code 402 into two parts. The first portion of control flow graph 410 is the address taken region 412. The address taken region includes all reachable nodes in control flow graph 410 at which the address of the target variable is taken. The second portion of control flow graph 410 is address not taken region 414. Address not taken region 414 includes all other reachable nodes within control flow graph 410.

A reachable node is a node that is connected from a node through which control enters into the flow of control flow graph 410. The code associated with a reachable node may be executed during execution of program code 402. If a node is not connected from the node at which control enters into the flow of control flow graph 410, the basic block represented by the node is unreachable during any execution. In other words, the code associated with the node is not executed during execution of program code 402.

Controller 406 creates a non-address taken temporary variable. Controller 406 replaces all references of the original target variable in address not taken region 414 with the temporary variable. The intermediary point from address not taken region 414 to address taken region 412 is the point where the target variable's address is first taken. At the intermediary point, the target variable is initialized with the value from the temporary variable.

In this example, the temporary variable replacement removes the address taken flag of the target variable that appears in the address not taken region. Because the temporary's address is not taken in the program, the subsequent compiler optimizations can treat this temporary variable more optimistically. For example, when the address taken variable's live range is across a procedure call, then the compiler needs to save and/or restore the target variable's value into another register or in memory prior or after the call. By replacing the address taken variable with the temporary variable, the compiler can treat it like a local variable and thus, save and restore of the target variable's value becomes unnecessary.

Queue 420 is a queue for storing information identifying a set of one or more nodes in control flow graph 410 where the target variables address is taken. In other words, every reachable node where the address of the target variable is taken is identified in queue 420. In this example, after candidate variables are identified by controller 406, controller 406 uses the control flow graph information for each candidate variable identified and records all the nodes where the candidate variable's address is being taken. This information is recorded or stored in queue 420. Queue 420 stores the nodes in order from the highest to the lowest in control flow graph 410. Moreover, queue 420 maintains two separate lists to keep track of the nodes where the load and/or store of the candidate variables occurs in control flow graph 410.

Data storage device 422 is any type of known or available device for storing data, such as, without limitation, a hard drive, a main memory, a disk, a flash memory, a nonvolatile random access memory (NVRAM) or any other type of data storage device. Data storage device 422 may be, for example, and without limitation, main memory 208 or hard disk drive 226 in FIG. 2.

Optimizer 424 is a software component for performing optimizations on program code 402. Optimizer 424 uses refined aliasing information available in control flow graph 410. Optimizer 424 may be implemented in any known or available optimizing compiler or other software component for performing optimizations on code.

Thus, in this example, a flow-sensitive method for refining address taken variables is implemented. Control flow graph 410 is partitioned into two parts. The first part, address taken region 412, consists of all the nodes in control flow graph 410 where the target variable's address has been taken. The other portion of control flow graph 410, address not taken region 414, contains the nodes in control flow graph 410 where the target variable's address has not been taken. A non-address taken temporary variable is created to replace all the references to the original target variable in address not taken region 414. At the intermediary point from address not taken region 414 to address taken region 412, the target variable is initialized with the value from the temporary variable to ensure program correctness. As compared with prior art solutions, the flow sensitive technique of FIG. 4 for refining address taken information is more efficient because it does not require inter-procedural information, and thus, it does not incur major compile and runtime overhead.

Moreover, refining address taken information by taking control flow information into account will generate more refined aliasing information for use in compiler optimizations. In one example, performance results show there is a seven percent (7%) runtime performance improvement in the spec2000 benchmark gap at a high optimization level.

Figure 5:
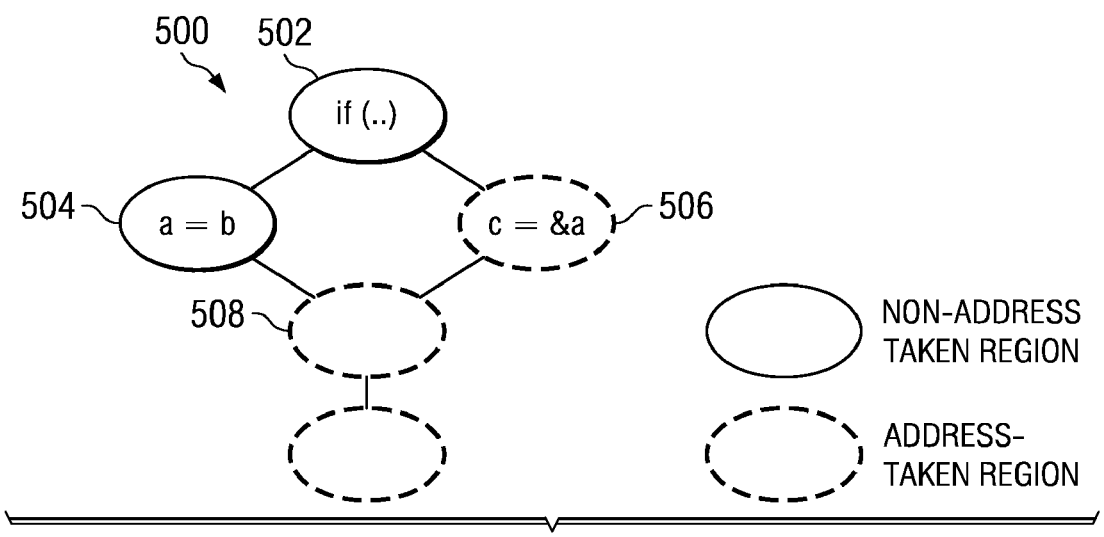
FIG. 5 is a diagram illustrating an address taken region and an address not taken region of a control flow graph in accordance with an illustrative embodiment.

FIG. 5 is a diagram illustrating an address taken region and an address not taken region of a control flow graph in accordance with an illustrative embodiment. Control flow graph 500 is a control flow graph for program code, such as, but not limited to, control flow graph 410 in FIG. 4.

Control flow graph 500 has been partitioned or separated into two regions to form a modified computer program. One region is an taken address portion of the control flow graph 500, such as, but not limited to, address taken region 412 in FIG. 4. The other region is an untaken address portion of control flow graph 500, such as address not taken region 414 in FIG. 4.

In this example, the target variable is variable "a." Nodes 502 and 504 are nodes in the address not taken region because the address of the target variable "a" is not taken by any of the statements in nodes 502 or nodes 504. However, in node 506, the address of the target variable "a" is taken in the statement "c=&a" which assigns the address of "a" to the variable "c". Therefore, node 506 and nodes executed after node 506, such as node 508, are identified as nodes in the taken address portion of control flow graph 500.

Figure 6:
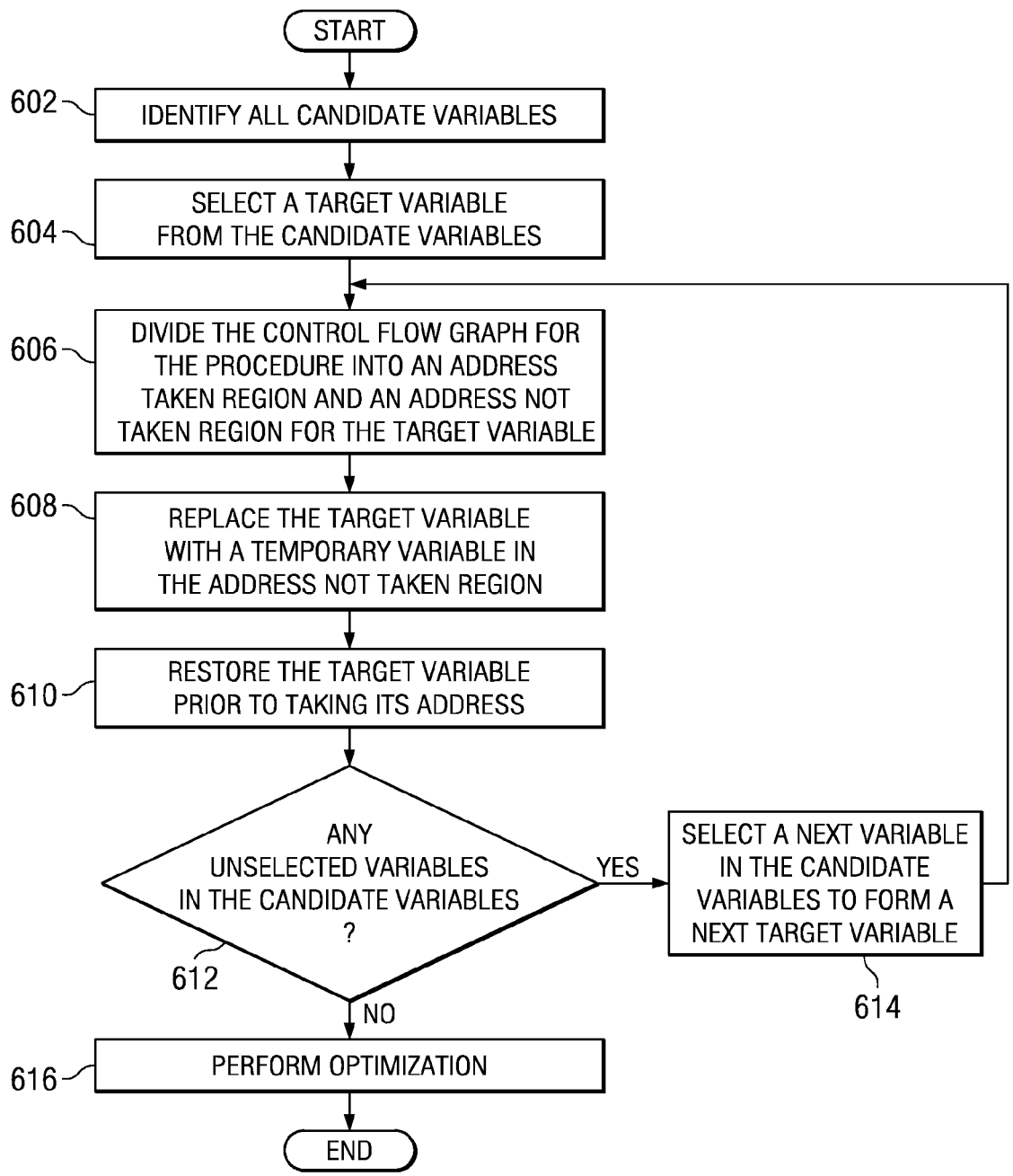
FIG. 6 is a flowchart illustrating a process for using flow sensitive information for refining address taken variables in accordance with an illustrative embodiment.

Referring now to FIG. 6, a flowchart illustrating a process for using flow sensitive information for refining address taken variables is shown in accordance with an illustrative embodiment. The process shown in FIG. 6 may be implemented by a software component for obtaining flow sensitive aliasing information for use in improving compiler optimizations, such as controller 406 in FIG. 4.

The process begins by identifying all candidate variables (step 602). The process selects a target variable from the candidate variables (step 604). The control flow graph for the procedure is divided into an address taken region and an address not taken region for the target variable (step 606).

The process replaces the target variable with a temporary variable in the address not taken region (step 608). The process then restores the target variable in the address taken region prior to a statement in the address taken region taking the address of the target variable (step 610).

The process makes a determination as to whether any unselected variables remain in the candidate variables (step 612). If any unselected variables remain, the process selects the next variable in the candidate variable to form a next target variable (step 614). The next target variable is then used to divide the control flow graph for the procedure into an address taken region and an address not taken region for the next target variable (step 606). The process iteratively executes steps 606-614 until all the candidate variables have been selected as the target variable. In this manner, the process walks through each basic block in the control flow graph from the top down to identify all candidate variables. For each candidate variable, the process performs a breadth first traversal in the control flow graph to divide the graph into the two regions, replace the target variable with the temporary in the address not taken region and load the value of the temporary to the target variable prior to the point where the target variable's address is being taken in the address not taken region. When all the candidate variables have been selected to be the target variable at step 612, the process uses the aliasing information available in the control flow graph for each candidate variable and performs optimizations using the aliasing information (step 616) with the process terminating thereafter.

The cleanup of the code is performed by subsequent optimizations, such as, without limitation, dead store, dead code elimination, and copy propagation, using the refined aliasing information to improve optimization. The code cleanup is performed by subsequent dataflow optimization. If it turns out that the temporary variables are actually dead code, then the temporary variables will be discarded by the dataflow optimizations. This ensures that no redundant temporaries are inserted into the program.

Figure 7:
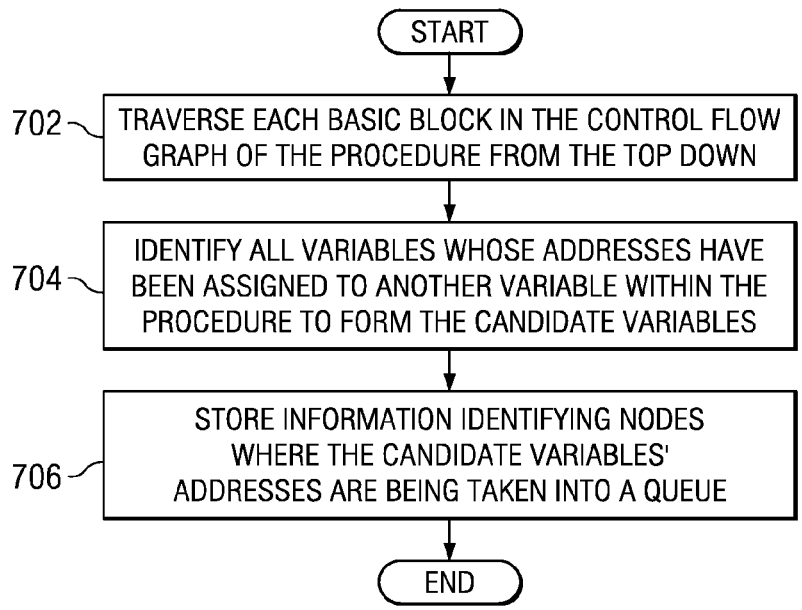
FIG. 7 is a flowchart illustrating a process for identifying candidate variables in accordance with an illustrative embodiment.

FIG. 7 is a flowchart illustrating a process for identifying candidate variables in accordance with an illustrative embodiment. The process in FIG. 7 is a more detailed description of step 602 in FIG. 6. The process shown in FIG. 7 may be implemented by a software component for obtaining flow sensitive aliasing information for use in improving compiler optimizations, such as controller 406 in FIG. 4.

The process begins by traversing each basic block in the control flow graph of the procedure from the top down (step 702). The process identifies all variables having an address that has been assigned to another variable within the procedure to form candidate variables (step 704). The process then records or stores the information identifying the nodes where the candidate variables' addresses are being taken into a queue (step 706) with the process terminating thereafter. In other words, the process records all the variables that have addresses that have been assigned to another variable within the procedure. This includes actual parameters whose addresses are stored in the corresponding formal. The analysis is efficient because it is linear to the size of the program.

The optimization performed using the aliasing information generated by this process does not rely on any inter-procedural information, therefore, global variables and parameters that are passed by reference are not considered as candidate variables. Furthermore, in this example, to amortize the runtime cost of saving and restoring the candidate variables with the temporary variables, aggregates, arrays, and members of an aggregate are bypassed and not identified as candidate variables. Moreover, volatile variables are avoided to improve the correctness and/or accuracy of the optimized code.

Figure 8:
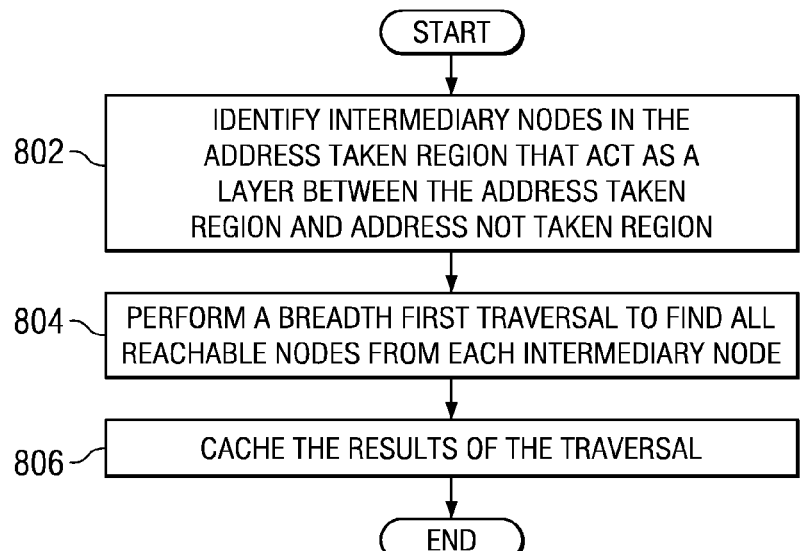
FIG. 8 is a flowchart illustrating a process for dividing the control flow graph for a procedure into an address taken and an address not taken region in accordance with an illustrative embodiment.

Turning now to FIG. 8, a flowchart illustrating a process for dividing the control flow graph for a procedure into an address taken and an address not taken region is depicted in accordance with an illustrative embodiment. The process in FIG. 8 is a more detailed description of step 606 in FIG. 6. The process shown in FIG. 8 may be implemented by a software component for obtaining flow sensitive aliasing information for use in improving compiler optimizations, such as controller 406 in FIG. 4.

The process begins by identifying intermediary nodes in the address taken region that act as a layer between the address taken region and the address not taken region (step 802). The process performs a breadth first traversal to find all the nodes that are reachable from this intermediary node (step 804). In one embodiment, the nodes that are reachable from the intermediary node are added to the address taken region of the control flow graph. The process then caches the results of the traversal (step 806) with the process terminating thereafter.

In this example, the process identifies intermediary nodes using the information stored in a queue, such as queue 420 in FIG. 4. The queue stores information regarding nodes where the load and/or store of candidate variables occurs and the nodes where the target variable's address is being taken.

In one embodiment, if the graph traversal visits a node that can be found in the queue, then this node is removed from the queue because it has since been traversed. Moreover, if the traversal revisits its starting intermediary node again, the intermediary node is marked to indicate a landing pad node is needed to be inserted. The traversal is repeated for other nodes in the queue until the queue is empty.

In another embodiment, the graph traversal halts once a control flow graph node has been revisited, to make the process more efficient. The address not taken region of the target variable is simply the control flow graph nodes that are not included in the address taken region. In other words, the address not taken region contains all of the nodes that are unreachable by the nodes where the target variable's address is taken.

Figures 9, 11:
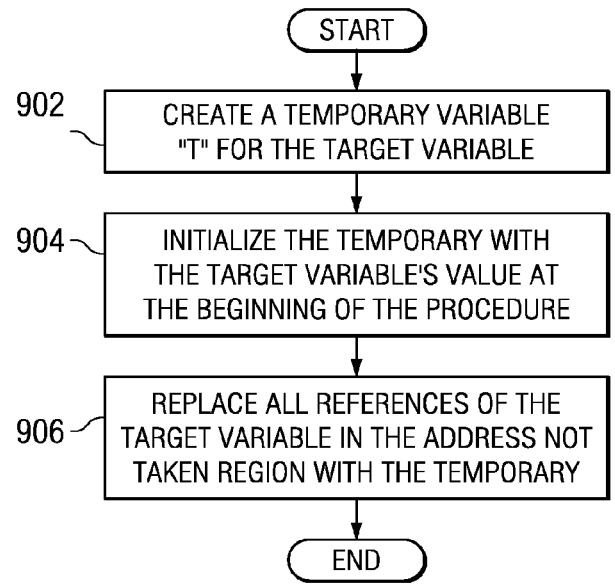
FIG. 9 is a flowchart illustrating a process for replacing the target variable with a temporary variable in an address not taken region in accordance with an illustrative embodiment.
FIG. 11 is a diagram illustrating using flow sensitive information for refining a target variable in accordance with an illustrative embodiment.

FIG. 9 is a flowchart illustrating a process for replacing the target variable with a temporary variable in an address not taken region in accordance with an illustrative embodiment. The process in FIG. 9 is a more detailed description of step 608 in FIG. 6. The process shown in FIG. 9 may be implemented by a software component for obtaining flow sensitive aliasing information for use in improving compiler optimizations, such as controller 406 in FIG. 4.

The process begins by creating a temporary variable "T" for the target variable (step 902). The temporary variable is created with a type based on the type of the target variable. In other words, if the target variable is an "int", then the temporary variable will also be created with the same data type "int". The process initializes the temporary variable with the value of the target variable at the beginning of the procedure (step 904). The process replaces all the references to the target variable in the address not taken region with the temporary (step 906) with the process terminating thereafter.

In all the intermediary nodes, prior to the point where the target variable's address is being taken, the value of the temporary variable is loaded to the candidate variable. However, special treatment is needed when replacing the store to the target variable in the node with a store to the temporary and the containing control flow graph node of the store is not post-dominated by an intermediary node. The target variable is restored by the temporary at the end of this node if the target variable is loaded later in the address taken region. This prevents the value stored to the target variable from being destroyed by the temporary replacement.

Figure 10:
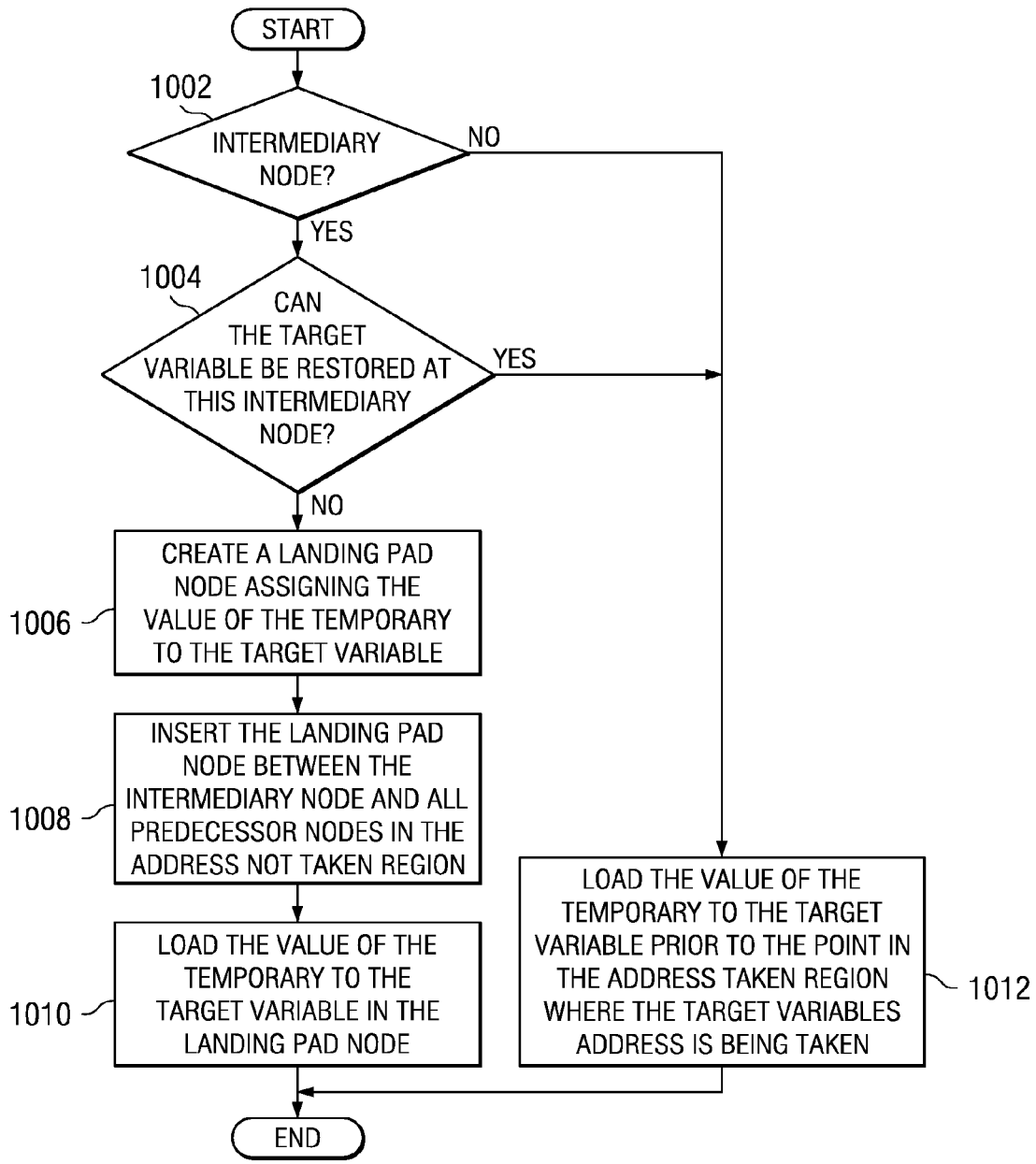
FIG. 10 is a flowchart illustrating a process for restoring the target variable in the address taken region in accordance with an illustrative embodiment.

Referring now to FIG. 10, a flowchart illustrating a process for restoring the target variable in the address taken region is depicted in accordance with an illustrative embodiment. The process in FIG. 10 is a more detailed description of step 610 in FIG. 6. The process shown in FIG. 10 may be implemented by a software component for obtaining flow sensitive aliasing information for use in improving compiler optimizations, such as controller 406 in FIG. 4.

The process begins by making a determination as to whether a node in a control flow graph is an intermediary node (step 1002). If the node is an intermediary node, the process makes a determination as to whether the target variable can be restored at this intermediary node (step 1004). If the target variable cannot be restored at this node, the process creates a landing pad node assigning the value of the temporary variable to the target variable (step 1006). In other words, a node is created that is associated with code for assigning the temporary value to the target variable. For example, if the target variable is "a" and the temporary variable is "T", the landing pad node includes code such as, without limitation, "a=T".

The process inserts the landing pad node between the intermediary node and all predecessor nodes in the address not taken region (step 1008). For example, in FIG. 5, the landing pad node would be inserted between node 502 and node 506.

Next, the process replaces or loads the value of the temporary variable to the target variable in the landing pad node (step 1010) with the process terminating thereafter.

Returning to step 1004, if the target variable can be restored at a given intermediary node, the process loads the value of the temporary variable to the target variable prior to the point in the address taken region where the address of the target variable is taken (step 1012) with the process terminating thereafter.

In the example in FIG. 10, the target variable cannot be restored at a given intermediary node in certain special cases. For example, when the address of the target variable is taken within a loop, the target variable is restored with the temporary before the loop begins. For this situation, a new control flow graph is created which consists of a statement for restoring the target variable with the temporary variable. This new node, referred to above as the landing pad node, is inserted between the address taken region and the non-address taken region. This ensures that the value loaded to the target variable in the address taken region is correct.

If an intermediary node cannot be restored at the intermediary node, the intermediary node is marked to form a marked intermediary node. The assignment of the temporary's value to the target variable must not occur in these cases until after the variable's address is taken. The process inserts the landing pad node between the intermediary node and all predecessor node in the address not taken region to assign the value of the temporary to the target variable before the address taken region in which the address of the target variable is taken.

The stores used to initialize the address taken variable on the intermediary and/or landing pad nodes will not worsen the performance of the program because they would have had to be performed anyway, even if this transformation described in FIGS. 9 and 10 were not applied. This transformation is just deferring these stores to the address taken variable as late as possible to improve optimization.

FIG. 11 is a diagram illustrating using flow sensitive information for refining a target variable in accordance with an illustrative embodiment. Code 1100 is an example of program code, such as program code 402 in FIG. 4. The process traverses or walks through each basic block in the control flow graph from the top down to identify candidate variables. A target variable is selected from the candidate variables. In this example, the target variable is "a". For each target variable, the process performs a breadth first traversal in the control flow graph to divide the graph into address taken region and address not taken region. In this example, the statement "b+=a" in line 1102 is included in a node in the address not taken region. The statement "bar(&a)" in line 1104 is included in a node in the address taken region.

Referring now to code 1110, a temporary variable "T" is created for the target variable. The temporary variable "T" is initialized with the value of the target variable at the beginning of the function at line 1112. All the references of the target symbol in the address not taken region are replaced by this temporary value.

Turning now to code 1120, the target variable is then replaced with the temporary variable prior to the point where the address of the target variable is being taken at line 1112. In this manner, the value of the temporary is loaded to the target variable when the code is executed.

Thus, the illustrative embodiments provide a computer implemented method, apparatus, and computer usable program code for obtaining aliasing information for a target variable in a computer program. In one embodiment, a set of intermediary nodes in a plurality of nodes in a control flow graph associated with the computer program is identified. An intermediary node is a node at which an address of a target variable is taken. The control flow graph is partitioned into an taken address portion and an untaken address portion to form a modified computer program. The taken address portion comprises all reachable nodes within the plurality of nodes at which an address of the target variable is taken. The untaken address portion comprises all other reachable nodes within the plurality of nodes. All references to a target variable are replaced with a temporary variable in the untaken address portion of the modified computer program. The target variable is initialized with the value from the temporary variable at each intermediary node in the set of intermediary nodes in the taken address portion of the modified computer program. The aliasing information for the target variable is obtained using the modified computer program. The modified computer program helps an alias analysis to generate more refined aliasing information for the computer program.

The process of the embodiments allows for handling loops in a manner that prevents the temporary variable "T" from being moved unsafely. The process provides a low overhead process for obtaining the benefits of flow sensitive aliasing information without incurring compile-time overhead by substituting a temporary variable in a section of code where the address of the variable is not taken. In this manner, a compiler is able to improve optimization of code in a manner that is both safe and avoids the costly overhead of flow insensitive aliasing.

Refining address taken information by taking control flow information into account generates more refined aliasing information. The refined aliasing information is utilized to perform optimization on the program code. Using the aliasing information for optimizing program code allows runtime performance improvements when the optimized program code is executed.

In other words, the illustrative embodiments enable optimizations to be performed by reducing aliasing interference without requiring costly flow-sensitive pointer analysis. The embodiments also improve code optimizations in situations where pointer analysis is insufficient, because the process is able to reduce the effect of pointers that are not resolved by pointer analysis.

The flowcharts and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the steps may occur out of the order noted in the figures. For example, two steps shown in succession may, in fact, be executed substantially concurrently, or the steps may sometimes be executed in the reverse order, depending upon the functionality involved.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk, millipede storage technology, Magneto-resistive random access memory (MRAM), or phase-change memory, also known as PCM, PRAM, Ovonic Unified Memory, and Chalcogenide RAM (C-RAM). Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for obtaining aliasing information for a target variable in a computer program, the computer implemented method comprising:
   generating a control flow graph for the computer program that includes a plurality of nodes having references to the target variable, and wherein each node in the plurality of nodes is a basic block of code in the computer program;
   identifying all variables that have an address assigned to another variable within the computer program to form candidate variables by traversing each basic block of code in the control flow graph;
   selecting a candidate variable from the candidate variables to form the target variable;
   partitioning the control flow graph representing the computer program into a taken address portion and an untaken address portion of the control flow graph by identifying intermediary nodes in the taken address portion that act as a layer between the taken address portion and the untaken address portion, performing a breadth first traversal to find all reachable nodes from each intermediary node that acts as the layer between the taken address portion and the untaken address portion in the control flow graph, and adding all the reachable nodes from each intermediary node to the taken address portion to form a modified computer program, wherein the taken address portion comprises all the reachable nodes within the plurality of nodes in the control flow graph at which the address of the target variable is taken, and wherein the untaken address portion comprises all other reachable nodes within the plurality of nodes;
   replacing, in the untaken address portion of the modified computer program, all references to the target variable with a temporary variable;
   determining whether a node in the control flow graph is an intermediary node;
   responsive to a determination that a node in the control flow graph is an intermediary node, determining whether the target variable is able to be restored at the intermediary node;
   responsive to a determination that the target variable is not able to be restored at the intermediary node, creating a landing pad node that has a value of the temporary variable assigned to the target variable, inserting the landing pad node between the intermediary node and all predecessor nodes in the untaken address portion of the modified computer program, and assigning the value of the temporary variable to the target variable in the landing pad node;
   responsive to a determination that the target variable is able to be restored at the intermediary node, assigning the value of the temporary variable to the target variable prior to a point in the taken address porting of the modified computer program where the address of the target variable is taken; and
   generating the aliasing information for the target variable using the modified computer program.

2. The computer implemented method of claim 1 wherein the target variable is not able to be restored at the intermediary node because the address of the target variable is taken within a loop.

3. The computer implemented method of claim 1 further comprising:
   initializing the temporary variable with a value of the target variable at a beginning of the computer program.

4. The computer implemented method of claim 1 further comprising:
   generating, by an alias analysis, refined aliasing information using the modified computer program.

5. A computer program product comprising:
   a computer readable storage medium including computer usable program code for obtaining aliasing information for a target variable in a computer program, said computer program product comprising:
   computer usable program code for generating a control flow graph for the computer program that includes a plurality of nodes having references to the target variable, and wherein each node in the plurality of nodes is a basic block of code in the computer program;
   computer usable program code for identifying all variables that have an address assigned to another variable within the computer program to form candidate variables by traversing each basic block of code in the control flow graph;
   computer usable program code for selecting a candidate variable from the candidate variables to form the target variable;
   computer usable program code for partitioning the control flow graph representing the computer program into an taken address portion and an untaken address portion of the control flow graph by identifying intermediary nodes in the taken address portion that act as a layer between the taken address portion and the untaken address portion, performing a breadth first traversal to find all reachable nodes from each intermediary node that acts as the layer between the taken address portion and the untaken address portion in the control flow graph, and adding all the reachable nodes from each intermediary node to the taken address portion to form a modified computer program, wherein the taken address portion comprises all the reachable nodes within the plurality of nodes in the control flow graph at which the address of the target variable is taken, and wherein the untaken address portion comprises all other reachable nodes within the plurality of nodes;
   computer usable program code for replacing, in the untaken address portion of the modified computer program, all references to the target variable with a temporary variable;
   computer usable program code for determining whether a node in the control flow graph is an intermediary node;
   computer usable program code, responsive to a determination that a node in the control flow graph is an intermediary node, for determining whether the target variable is able to be restored at the intermediary node;
   computer usable program code, responsive to a determination that the target variable is not able to be restored at the intermediary node, for creating a landing pad node that has a value of the temporary variable assigned to the target variable, inserting the landing pad node between the intermediary node and all predecessor nodes in the untaken address portion of the modified computer program, and assigning the value of the temporary variable to the target variable in the landing pad node;

computer usable program code, responsive to a determination that the target variable is able to be restored at the intermediary node, for assigning the value of the temporary variable to the target variable prior to a point in the taken address porting of the modified computer program where the address of the target variable is taken; and computer usable program code for generating the aliasing information for the target variable using the modified computer program.

6. The computer program product of claim 5 further comprising:

computer usable program code for initializing the temporary variable with a value of the target variable at a beginning portion of the computer program.

7. The computer program product of claim 5 wherein the target variable is not able to be restored at the intermediary node because the address of the target variable is taken within a loop.

8. An apparatus for obtaining aliasing information for a target variable in a computer program, the apparatus comprising:

a bus system;

a storage device connected to the bus system, wherein the storage device stores computer usable program code; and a processing unit coupled to the bus system, wherein the processing unit executes the computer usable program code to:

generate a control flow graph for the computer program that includes a plurality of nodes having references to the target variable, and wherein each node in the plurality of nodes is a basic block of code in the computer program;

identify all variables that have an address assigned to another variable within the computer program to form candidate variables by traversing each basic block of code in the control flow graph;

select a candidate variable from the candidate variables to form the target variable;

partition the control flow graph representing the computer program into an taken address portion and an untaken address portion of the control flow graph by identifying intermediary nodes in the taken address portion that act as a layer between the taken address portion and the untaken address portion, performing a breadth first traversal to find all reachable nodes from each intermediary node that acts as the layer between the taken address portion and the untaken address portion in the control flow graph, and adding all the reachable nodes from each intermediary node to the taken address portion to form a modified computer program, wherein the taken address portion comprises all the reachable nodes within the plurality of nodes in the control flow graph at which the address of the target variable is taken, and wherein the untaken address portion comprises all other reachable nodes within the plurality of nodes;

replace, in the untaken address portion of the modified computer program, all references to the target variable with a temporary variable;

determine whether a node in the control flow graph is an intermediary node;

determine whether the target variable is able to be restored at the intermediary node in response to a determination that a node in the control flow graph is an intermediary node;

create a landing pad node that has a value of the temporary variable assigned to the target variable, insert the landing pad node between the intermediary node and all predecessor nodes in the untaken address portion of the modified computer program, and assign the value of the temporary variable to the target variable in the landing pad node in response to a determination that the target variable is not able to be restored at the intermediary node;

assign the value of the temporary variable to the target variable prior to a point in the taken address porting of the modified computer program where the address of the target variable is taken in response to a determination that the target variable is able to be restored at the intermediary node; and generate the aliasing information for the target variable using the modified computer program.

9. The apparatus of claim 8 wherein the processing unit further executes the computer usable program code to initialize the temporary variable with a value of the target variable at a beginning of the computer program.

10. The apparatus of claim 8 wherein the target variable is not able to be restored at the intermediary node because the address of the target variable is taken within a loop.

* * * * *